(12) United States Patent
Bertin

(10) Patent No.: US 8,041,831 B2
(45) Date of Patent: Oct. 18, 2011

(54) METHOD FOR BROADCASTING A SERIES OF CONTENTS FROM A SOURCE TO RECEIVER TERMINALS, THROUGH A COMPUTER NETWORK, RELATED SIGNAL, BROADCASTING SOURCE AND TERMINAL

(75) Inventor: Christian Bertin, Rennes (FR)

(73) Assignee: France Telecom, Paris (FR)

( * ) Notice: Subject to any disclaimer, the term of this patent is extended or adjusted under 35 U.S.C. 154(b) by 995 days.

(21) Appl. No.: 10/498,927

(22) PCT Filed: Nov. 12, 2002

(86) PCT No.: PCT/FR02/03858
§ 371 (c)(1),
(2), (4) Date: Jun. 14, 2004

(87) PCT Pub. No.: WO03/051013
PCT Pub. Date: Jun. 19, 2003

(65) Prior Publication Data
US 2007/0118614 A1  May 24, 2007

(30) Foreign Application Priority Data
Dec. 13, 2001 (FR) ...................... 01 16180

(51) Int. Cl.
*G06F 15/16* (2006.01)
(52) U.S. Cl. .................. 709/232; 725/114; 709/205
(58) Field of Classification Search .............. 709/232
See application file for complete search history.

(56) References Cited

U.S. PATENT DOCUMENTS

| | | | | |
|---|---|---|---|---|
| 6,831,917 B1* | 12/2004 | Cheriton | ........................ | 370/392 |
| 6,857,130 B2* | 2/2005 | Srikantan et al. | ................ | 725/93 |
| 2002/0107940 A1* | 8/2002 | Brassil | ........................... | 709/219 |

FOREIGN PATENT DOCUMENTS
FR 2 796 790 A 1/2001

OTHER PUBLICATIONS

MPEG-2: A Tutorial Introduction to the Systems Layer, From: MPEG-2 What it is and What it isn't, IEE Colloquium, published Jan. 24, 1995.*

(Continued)

*Primary Examiner* — Andrew Caldwell
*Assistant Examiner* — Ryan J Jakovac
(74) *Attorney, Agent, or Firm* — Cozen O'Connor

(57) ABSTRACT

A method of broadcasting a succession of contents through a computer network from a broadcasting source (S) to a plurality of receiver terminals able to receive from the source. The method includes, for each content, sending data units conveying the content from the source through the computer network, and supplying the receiver terminals with an indication enabling them to identify each transition between two successive contents, thus enabling the receiver terminals to determine the time of a transition between successive contents more precisely. The data units to be broadcast are marked by modifying the marking of the data units of the successive contents separated by a single transition. The receiver terminals (T) are supplied with marking information enabling them to distinguish between data units belonging to different contents ($C_n$, $C_{n+1}$) with the aid of their marking.

13 Claims, 8 Drawing Sheets

OTHER PUBLICATIONS

D. Hoffman, G. Fernando, RFC 2250—RTP Payload Format for MPEG1/MPEG2 Video, Jan. 1998, pp. 1-18.*

H. Schulzrinne, S. Casner, R. Frederick, V. Jacobson, RFC 1889, RTP: A Transport Protocol for Real-Time Applications, Jan. 1996.*

P.A. Sarginson, "MPEG-2: A Tutorial Introduction to the Systems Layer", IEE Colloquium on MPEG What it is and What It Isn't, IEE, London, GB, 1995, pp. 4/1 to 4/13.

M. Handley et al., "SDP: Session Description Protocol", IETF, pp. 1-40, Apr. 1998.

* cited by examiner

METHOD FOR BROADCASTING A SERIES OF CONTENTS FROM A SOURCE TO RECEIVER TERMINALS, THROUGH A COMPUTER NETWORK, RELATED SIGNAL, BROADCASTING SOURCE AND TERMINAL

RELATED APPLICATIONS

This is a U.S. National Stage of International Application No. PCT/FR2002/003858 filed on 12 Nov., 2002.

This patent application claims priority of French Patent Application No. 01/16180 filed 13 Dec. 2001, the disclosure of which is hereby incorporated by reference.

FIELD OF THE INVENTION

The invention relates to a method of broadcasting a succession of contents from a broadcasting source to a plurality of receiver terminals through a computer network, such as the Internet in particular, and further relates to a broadcasting source and a receiver terminal suitable for implementing the method.

BACKGROUND OF THE INVENTION

Certain television stations broadcast a succession of contents such as television shows, films, and other programs in real time on the Internet from a broadcasting source S. The broadcasting mode used most often is the multicast mode, enabling the source S to broadcast each content to a plurality of receiver terminals in a single sending. The source S sends units of data conveying the content to be broadcast, in this instance IP data packets also known as IP datagrams. These packets are duplicated in cascade by routers situated at nodes of the network in order to be routed to the various receiver terminals. To receive a content, each terminal first recovers a session description protocol (SDP) file associated with the source S, for example by downloading it from an access portal via the Internet. The structure of the SDP file is defined by the Internet Engineering Task Force (IETF) and is described in the document RFC 2327. The file conveys the information required to enable the receiver terminals to begin to receive contents broadcast by the source S. A main SDP file contains all the information required to begin to receive from the source S, regardless of the content that is being broadcast. Other SDP files, specific to the contents (TV show, film, conference, etc.) broadcast by the source S, contain only the information necessary for receiving those particular contents. To receive a content broadcast by the source S, a terminal sends a request to acquire that content to the source via the Internet using the Internet Group Management Protocol (IGMP). The first Internet router to receive this request when it is already receiving IP data packets sent by the source S duplicates the IP data packets and routes them either to the terminal or to another router closer to the terminal.

The various contents broadcast successively by the source S have configuration characteristics that may vary from one content to another (resolution, frequency, 4/3 or 16/9 format, coding, for example MPEG4, MPEG2, audio in different languages, scrambling, or other parameters). To take account of such changes, the receiver terminals must be able to identify transitions between successive contents. To this end, it is known in the art, in particular in the field of MPEG2 satellite or cable television broadcasting, to communicate to the receiver terminals a temporal indication of the time at which the transition is scheduled. However, that solution is not totally satisfactory, for the following reasons: firstly, the temporal indication of the time of the transition is usually inaccurate and, secondly, that solution necessitates knowing the time of the transition accurately in advance, which may prove extremely difficult, if not impossible, in certain circumstances. Examples of such circumstances that may be cited are unscheduled interruptions of programs in order to broadcast a newsflash and live coverage of a tennis match, whose duration cannot be known in advance.

SUMMARY OF THE INVENTION

One aspect of the invention is directed to a method of broadcasting a succession of contents through a computer network from a broadcasting source S to a plurality of receiver terminals able to receive from the source. The method includes, for each content, sending data units conveying said content from the source through the computer network, and supplying the receiver terminals with an indication enabling them to identify each transition between two successive contents, thus enabling the receiver terminals to determine the time of a transition between successive contents more precisely. The data units to be broadcast are marked by modifying the marking of the data units of the successive contents separated by a single transition. The receiver terminals (T) are supplied with marking information enabling them to distinguish between data units belonging to different contents ($C_n$, $C_{n+1}$) with the aid of their marking.

Marking the data units enables the receiver terminals to identify transitions between successive contents in real time and with all the necessary accuracy. The terminals do not need to know the precise time of the transition to take account of changes between two successive contents separated by a transition. It is sufficient for them to have the marking information that enables them to distinguish between data units belonging to the two contents as a function of their marking, in other words that enables them to determine the content to which each data unit belongs from its marking.

It is advantageous if the data units of a content are broadcast on a broadcasting channel and the marking information relating to said content is broadcast on a signaling channel separate from the broadcasting channel. Thus the successive contents and the marking information relating to the contents are broadcast independently of each other on two separate channels.

In this case, the marking information relating to a given content is preferably inserted into enabling data relating to said content.

The enabling data relating to a content is broadcast on the signaling channel and contains the configuration characteristics of the content which enable the content to be used.

The marking information relating to a content is preferably sent during the broadcasting of a preceding content. The marking information relating to a content $C_{n+1}$ is generally sent to the receiver terminals a first time during the broadcasting of the preceding content $C_n$, unless its duration is insufficient. In this case, to alert the receiver terminals sufficiently far ahead of the scheduled time of the transition, the marking information relating to the content $C_{n+1}$ is sent the first time while broadcasting a content prior to $C_n$. However, it is not necessary to know the precise time of the transition, merely a time period during which the transition is scheduled.

In one particular embodiment of the invention, the broadcasting time remaining before said transition is evaluated and the marking information relating to the content following said transmission is transmitted when the remaining broadcasting time is below a predefined time threshold. The time remaining before the transition is determined approximately and the marking information is transmitted when this remaining time falls below the threshold.

In another embodiment, the marking information relating to the content after said transition is sent regularly throughout the broadcasting of the content preceding said transition. Thus it is no longer necessary to monitor the remaining broadcasting time of the current content.

The invention also provides a signal conveying a succession of contents segmented into data units which is characterized in that the data units belonging to different contents have respective different markings.

The invention further proposes a broadcasting source adapted to broadcast a signal as defined above through a computer network and a receiver terminal adapted to receive a signal as defined above through a computer network.

BRIEF DESCRIPTION OF THE DRAWINGS

The invention will be better understood with the aid of the following description of one particular embodiment of the broadcasting method of the invention and particular embodiments of the broadcasting server and the terminal of the invention, which description is given with reference to the appended drawings, in which.

DETAILED DESCRIPTION OF THE DRAWINGS

Figure 1:
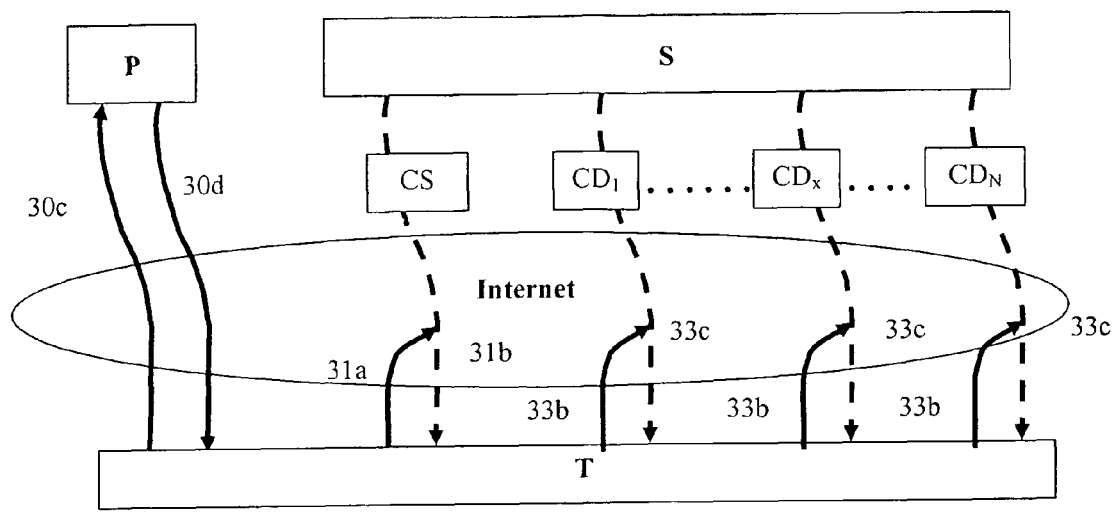
FIG. 1 is a diagram showing a broadcasting source, broadcast channels, a signaling channel, a portal, a receiver terminal, and the Internet.

FIG. 1 shows a broadcasting source S, a receiver terminal T, a TV portal P, and a computer network, in this instance the Internet.

Figure 2:
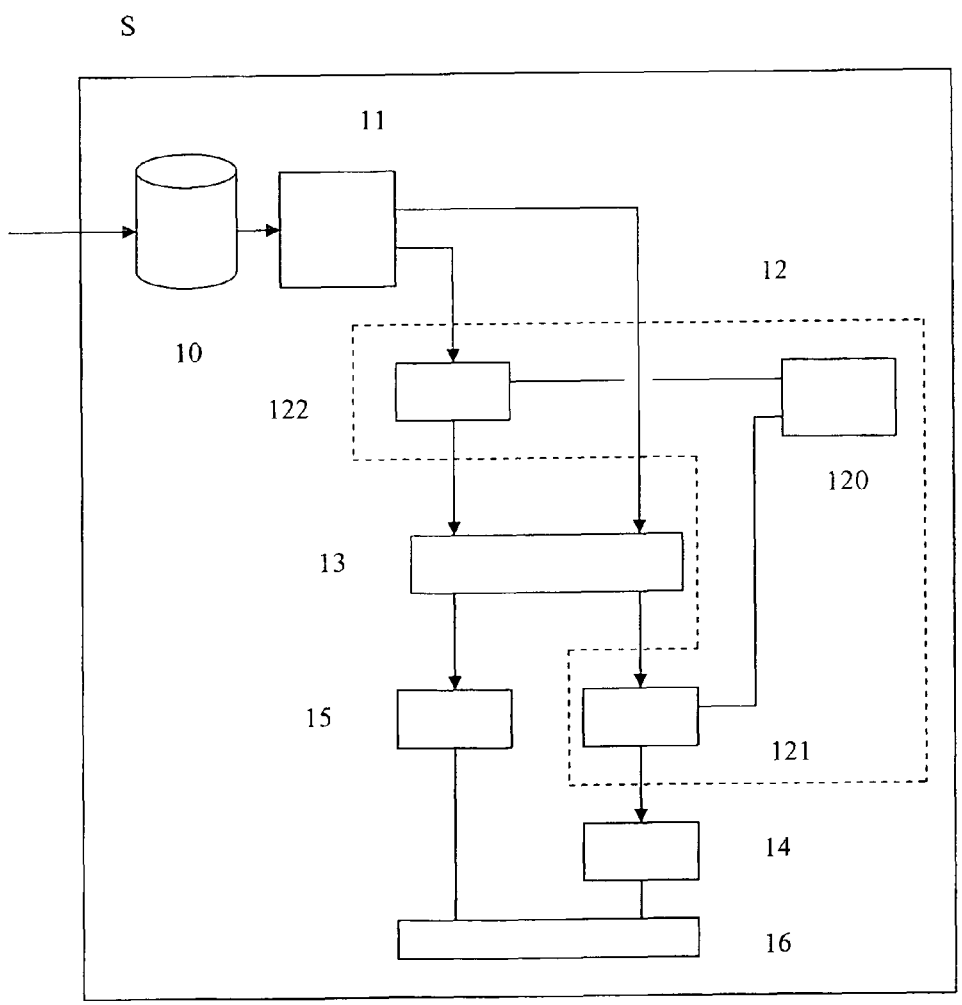
FIG. 2 is a functional block diagram of the broadcasting source from FIG. 1.

In the particular example of the present description, the source S is a television channel, referred to hereinafter as channel A, hosted by an Internet audiovisual server and broadcasting a succession of contents (television shows, films, advertisements, etc.) in multicast mode to the receiver terminals T via the Internet. Referring to FIG. 2, the source S comprises a database 10, a broadcasting control module 11, a marking module 12, a segmentation module 13, two sending modules 14 and 15, and an Internet connection interface 16.

The database 10 is fed by a programming centre, not shown, and contains contents $C_n$ to be broadcast and associated enabling data DE for each content $C_n$. By definition, the enabling data DE relating to a content $C_n$ consists of data enabling a receiver terminal T to read that content. In this instance, the enabling data DE relating to the content $C_n$ contains:

i) information necessary for receiving one or more broadcast channels $CD_x$ on which the content $C_n$ is broadcast, namely the multicast Internet address of each of the broadcast channels $CD_x$, the transmission mode used (synchronization layer, multiplexing), and the various broadcast data streams (audio, video, etc.), with the names of the ports sending those streams, and ii) configuration characteristics of the content $C_n$ that are necessary for the receiver terminals to decode the content $C_n$ correctly (resolution, frequency, format, coding, language, and scrambling characteristics).

The control module 11 controls the broadcasting of the contents and the corresponding enabling data via the Internet.

The segmentation module 13 is connected to the control module 11 and to the two sending modules 14, 15 and is adapted to segment the contents and the enabling data into data units, in this instance into Internet Protocol (IP) data packets, to be broadcast on the Internet.

Figure 4A:
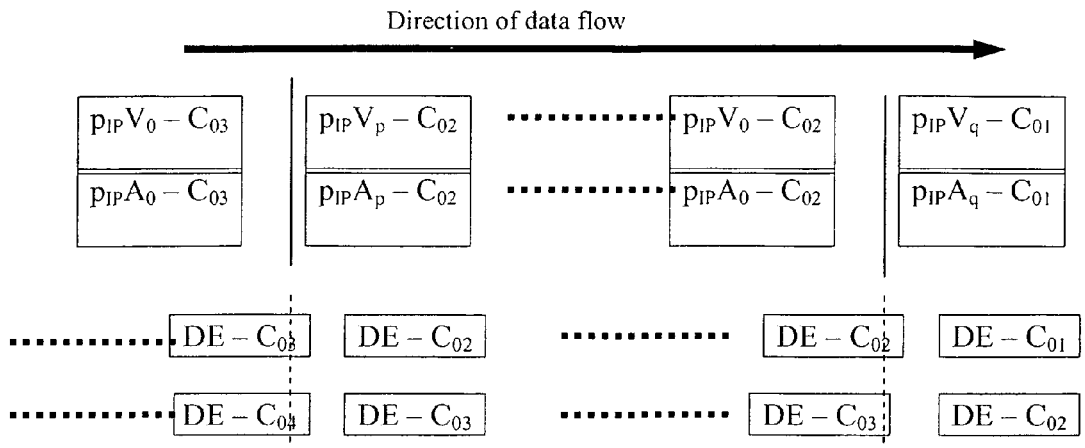
FIGS. 4a and 4b show data units and enabling data units broadcast by the FIG. 1 source in two different broadcasting modes.
Figure 4B:
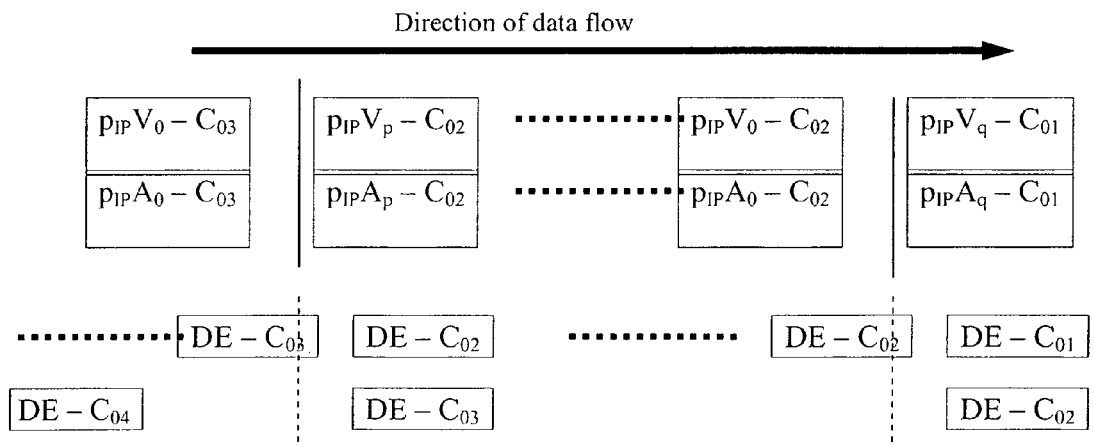

The two sending modules 14, 15 are connected to the Internet connection interface 16. To broadcast a content, the module 14 sends a signal conveying the content in multistream mode on broadcast channels $CD_x$. In parallel with this, the module 15 regularly sends the enabling data of the content on a signaling channel CS. The multistream broadcast mode consists in sending, for each type of data (audio, video, etc.), a basic data stream and one or more complementary data streams intended to enhance the quality of the signal conveyed by the basic stream. Each receiver terminal may thus adapt the quality of the signal received to its own capabilities, using the basic stream and where appropriate one or more of the complementary streams. The source S segments each stream into IP data packets and sends the IP packets via the Internet on a broadcast channel $CD_x$. FIG. 4b shows part of the basic video stream and the basic audio stream, segmented into video IP data packets $P_{IP}V_x$ and audio IP data packets $P_{IP}A_x$, respectively, of three contents $C_{01}, C_{02}, C_{03}$ broadcast successively by the source S. The arrow indicates the direction of flow of the data. Thus data on the right-hand side in the figure is sent by the source S before data on the left-hand side. In parallel with this, as may also be seen in FIG. 4, while broadcasting each content, the source S regularly sends the enabling data DE of that content. Also, the source S sends the enabling data for the content following the transition via the signaling channel CS at least once before each transition between two successive contents.

Figure 5A:
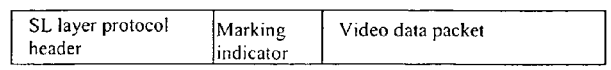
FIGS. 5a and 5b show two data packets marked at the level of the SL layer and at the level of the Flexmux layer, respectively.
Figure 5B:
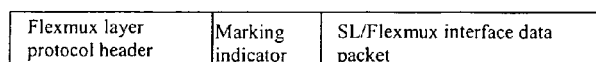

The marking module 12 comprises a marking control unit 120 and two insertion units 121, 122. The insertion unit 121 is between the segmentation module 13 and the sending module 14 and the insertion unit 122 is between the control module 11 and the segmentation module 13. The control unit 120 assigns each content to be broadcast a marking indicator and controls the operation of the two insertion units 121, 122. In the particular example of this description, the marking indicators are assigned modulo 256. In other words, the marking indicators respectively assigned to the successive contents are successive numbers from a set of numbers ranging from 0 to 255, the marking indicator of a content being one more than the marking indicator of the preceding content unless said content is equal to 255, in which case the marking indicator of the next content is equal to 0. Sequentially and cyclically assigning successive contents marking indicators from a set of limited size separates contents carrying the same marking indicator by a sufficiently long time interval to prevent confusion between those contents in the receiver terminals T without it being necessary to use an excessively high number of different marking indicators. During the broadcasting of a content $C_n$, the insertion unit 121 marks all the IP data packets of that content $C_n$ by inserting therein the marking indicator assigned to that content $C_n$, in a header of a protocol layer, in this instance the synchronization layer (SL). The synchronization layer is an application layer. FIG. 5a shows a video data packet at the level of the synchronization layer, comprising the SL header, the number assigned to the content concerned, i.e. the marking indicator, and the video data of that content. The marking indicator could equally be inserted at the level of the Flexmux layer, which is below the synchronization layer, as shown in FIG. 5b. The marking indicator enables the receiver terminals T to identify the content $C_n$ to which the IP data packet belongs. The role of the marking indicators is generally to enable the receiver terminals T to distinguish between IP data packets that belong to different contents, as a function of the content to which they belong, and thereby to mark transitions between successive contents. In parallel with this, the insertion unit 122 inserts into the enabling data relating to the content $C_n$ the marking indicator assigned to that content $C_n$, as explained later.

Figure 3:
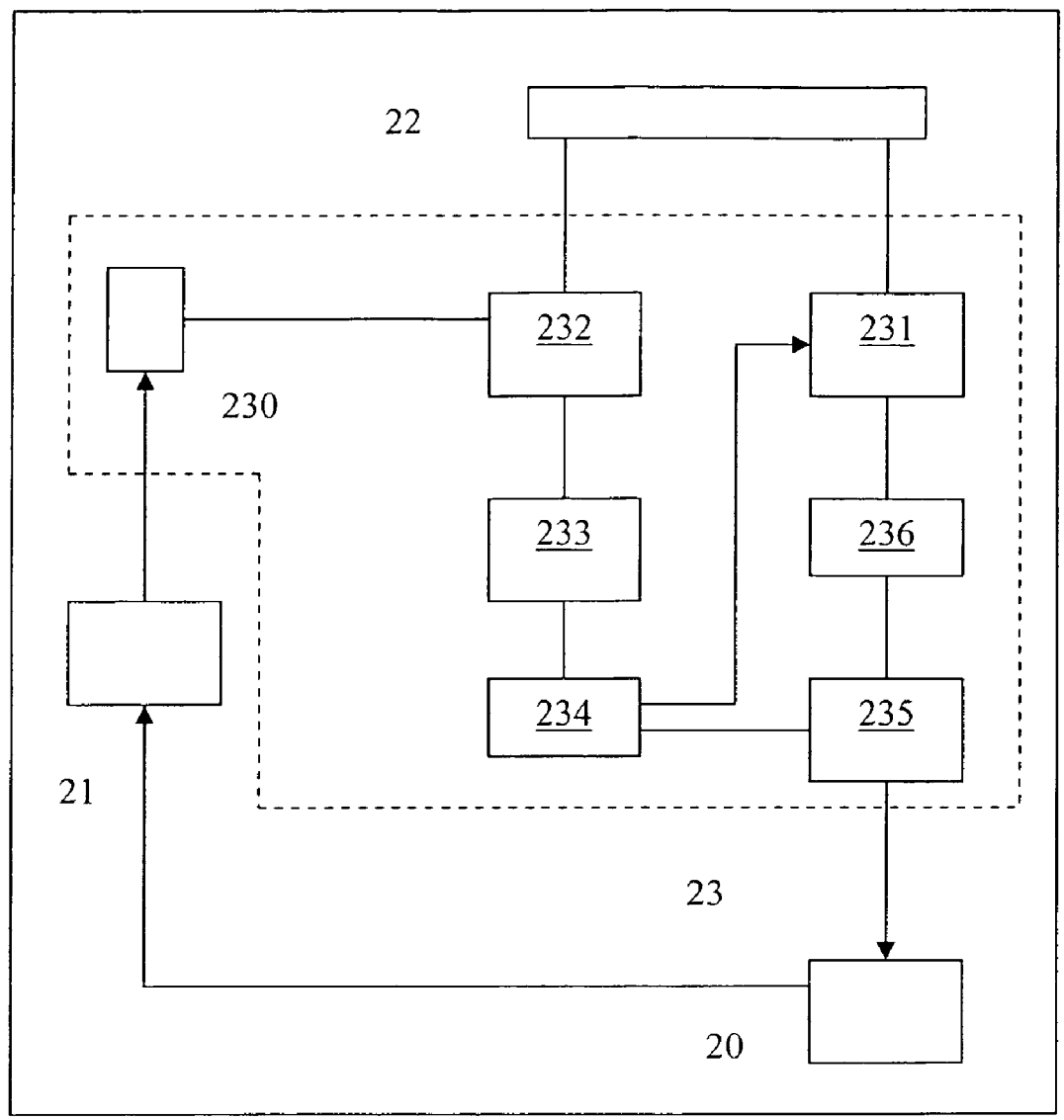
FIG. 3 is a functional block diagram of the receiver terminal from FIG. 1.

Referring to FIG. 3, the terminal T comprises a man-machine interface 20 comprising a display screen, input means (here a keyboard and a device for selecting and moving a cursor on the screen), a loudspeaker, an Internet browser 21, an Internet connection module 22, an operation module 23, and a central control unit, not shown.

The operation module 23 enables the terminal T to receive and use, i.e. to read, contents that are broadcast via the Internet by various broadcasting sources, and in particular by the source S. It comprises a memory 230 for storing an SDP descriptive file relating to a broadcasting source, a unit 231 for receiving broadcast channels $CD_x$ from the source, a unit 232 for receiving a signaling channel CS from the source, a unit 233 for recording enabling data in a memory 234, and a decoding unit 235. The two receiving units 231 and 232 are connected to the Internet connection module 22. The decoding unit 235 is connected to the memory 234, to the receiving unit 231, and to the man-machine interface module 20.

The receiving unit 232, which is connected to the memory 230, is adapted to receive the signaling channel CS with the aid of information contained in the SDP file stored in the memory 230 and to receive the enabling data broadcast via the signaling channel CS. The recording unit 233, which is between the receiving unit 232 and the memory 234, is adapted to store in the memory 234 enabling data received by the unit 232 via the signaling channel CS. The memory 234 therefore contains, for each content $C_n$ broadcast by the source S, information necessary for receiving the content $C_n$, the configuration characteristics of the content $C_n$, and the associated marking indicator, which is assigned to the content $C_n$ by the source S. The receiving unit 231, which is connected to the memory 234, is adapted, with the aid of enabling data stored in the memory 234, to receive the broadcast channels $CD_x$ and thus to receive contents broadcast via the broadcast channels $CD_x$.

The operating module 23 further comprises a detection unit 236 between the receiving unit 231 and the decoding unit 235. The detection unit 236 is adapted to detect the marking indicator inserted into each IP data packet received via a broadcasting channel $CD_x$ and to supply it to the decoding unit 235. On reception of a content via the broadcast channels $CD_x$, the detection unit 236 detects the marking indicator inserted into the received IP packets conveying that content and supplies it to the decoding unit 235, which unit looks in the memory 234 for enabling data associated with that marking indicator, which is that for the received content, extracts the configuration characteristics therefrom, and, using those characteristics, decodes the received IP packets for local broadcasting of the content via the man-machine interface 20.

The TV portal P is an Internet television website which offers a TV guide and hypertext links to TV channels. The portal P contains in particular the programs of channel A.

The method of broadcasting a succession of contents from a broadcasting source S to a plurality of receiver terminals T via the Internet is described next.

Referring to FIG. 4, the source S broadcasts in multicast mode and in multistream mode over the broadcast channels $CD_x$ a signal conveying a succession of contents segmented into marked IP data packets and, in parallel with this, regularly sends enabling data for the content being broadcast on the signaling channel CS. The source S assigns sequential marking indicators to the successive contents in order to modify the marking of the IP data packets of successive contents separated by a single transition. Consequently, the IP packets relating to two successive contents separated by a single transition contain respective different marking indicators.

FIGS. 10 to 13 depict the operation of the source S when broadcasting two successive contents $C_n$ and $C_{n+1}$. In a step 40, the source S broadcasts the content $C_n$ via the broadcast channels $CD_x$. For this purpose, the source S segments the content $C_n$ into IP packets in a step 40a, inserts the marking indicator assigned to the content $C_n$ into the header of the IP packet at the level of the SL protocol layer in a step 40b, and then sends the marked IP packets over the Internet via the channels $CD_x$ in a step 40c. In parallel with the step 40, the source S broadcasts enabling data DE for the content $C_n$ via the signaling channel CS in a step 41. For this purpose, the source S inserts the marking indicator assigned to the content $C_n$ into the enabling data DE of the content $C_n$ in a step 41a, segments this enabling data DE into IP packets in a step 41b, and then sends the IP packets over the Internet via the channel CS in a step 41c. In a step 42, once it has sent the enabling data DE for the content $C_n$, the source S verifies if the transition between the content $C_n$ and the content $C_{n+1}$ has occurred. The step 41 of sending the enabling data DE for the content $C_n$ is repeated with a period T until the transition occurs. Immediately the transition has occurred, step 41 is executed, but for the content $C_{n+1}$. In other words, after the transition, the source S sends enabling data for the content $C_{n+1}$.

In parallel with the step 41, during broadcasting of the content $C_n$, the source S monitors the remaining time $\tau$ to broadcast the content $C_n$, regularly comparing it to a predefined threshold s (step 44). As soon as the remaining time $\tau$ is below the threshold s, the source S sends the enabling data DE for the next content $C_{n+1}$ via the signaling channel CS (step 45). If the remaining time to broadcast the content $C_n$ allows, the source S sends the enabling data DE for the content $C_{n+1}$ several times before the transition between the content $C_n$ and the next content $C_{n+1}$ (step 46).

Figure 6:
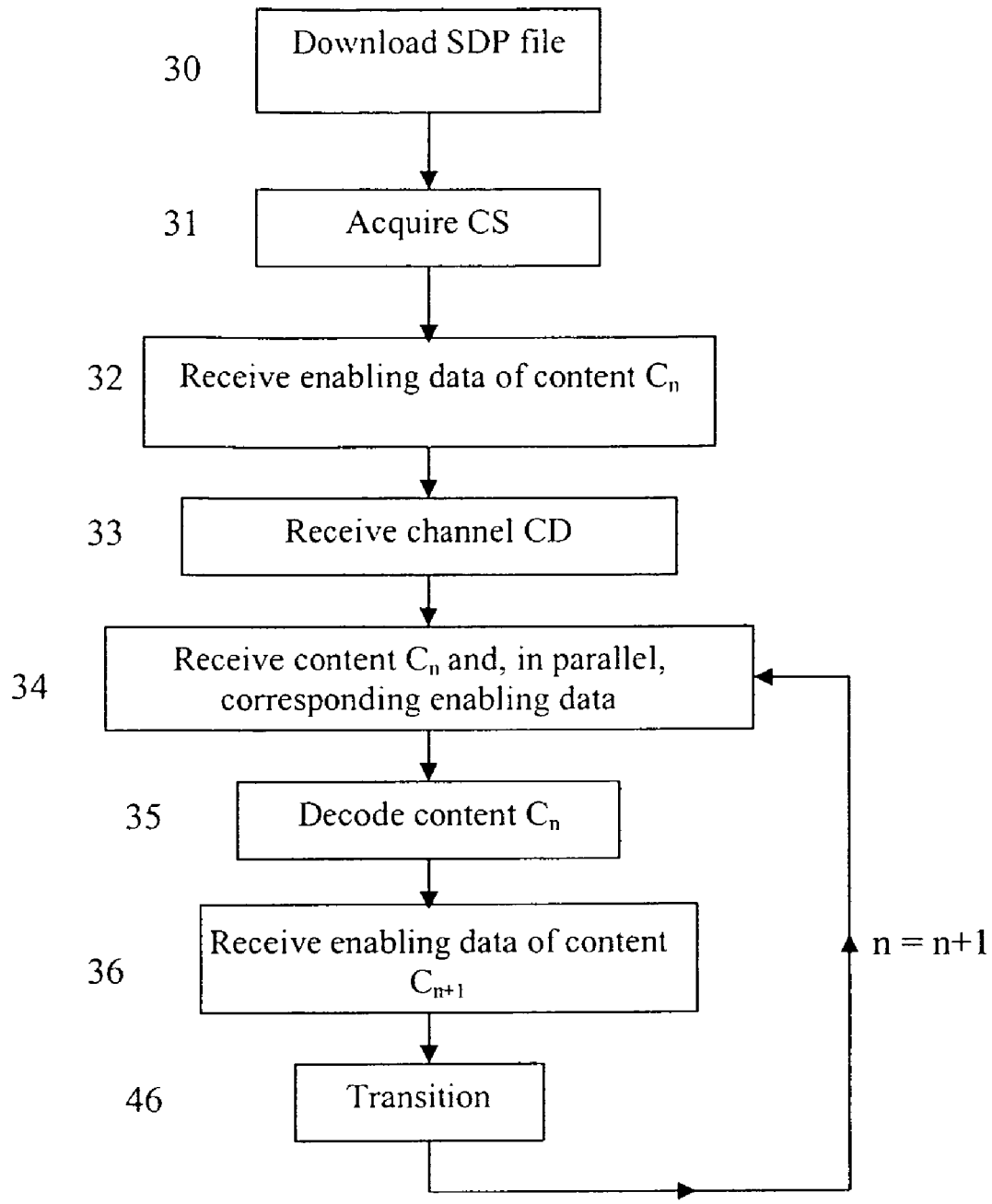
FIGS. 6 to 14 are flowcharts showing steps of a broadcasting method of the particular embodiment of the invention described here.

Referring to FIG. 5, in a step 30 the receiver terminal T recovers from the source S an SDP file containing all the information necessary for receiving the signaling channel CS from the source S, by downloading it from the portal P via the Internet. To this end, as may be seen in FIG. 6, the terminal T connects to the portal P in a step 30a and downloads from the portal P a web page containing a TV guide for a plurality of channels and hyperlinks to those channels, including the channel A, in a step 30b. Under the control of a user, the receiver terminal T activates the link to the channel A in a step 30c, sending the portal P a request to acquire the SDP file from the source S. On receiving the request, the portal P sends the required SDP file to the terminal T via the Internet in a step 30d. The terminal T stores the SDP file from the source S in the memory 230 in a step 30e, in order to use it to receive from the source S either immediately after downloading or later. The SDP file from the source S contains all the information the terminal T requires to begin to receive the signaling channel CS from the source S.

Figure 7:
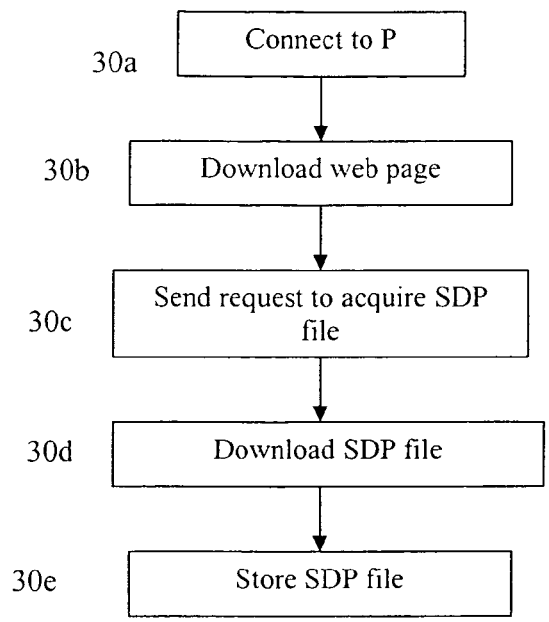

To begin to receive the broadcast channels $CD_x$ from the source S, the terminal T acquires the signaling channel CS beforehand, in a step 31 (FIG. 5). As may be seen in FIG. 7, using the Internet Group Management Protocol (IGMP), the terminal T sends a request to acquire the signaling channel CS via the Internet in a step 31a using information supplied by the recovered SDP file stored in the memory 230. In a step 31b, the first Internet router that receives this request when it is already receiving enabling data units sent by the source S duplicates the data units, which are then routed to the terminal T. Thus the terminal T receives the signaling channel CS from the source S.

Figure 8:
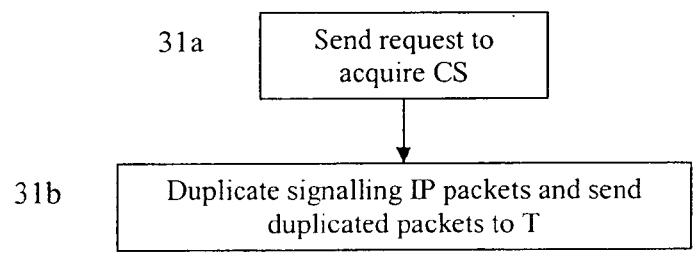
Figure 9:
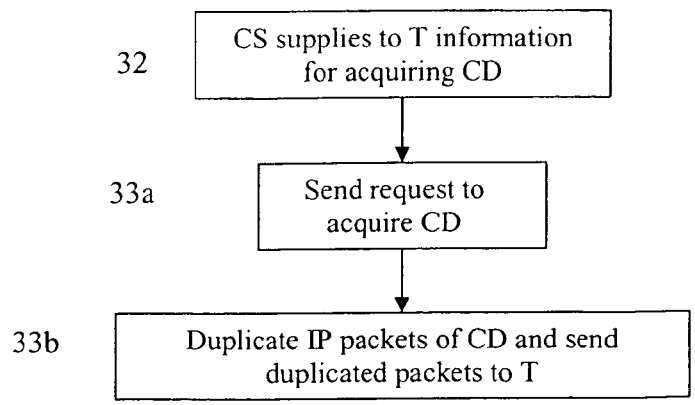
Figure 10:
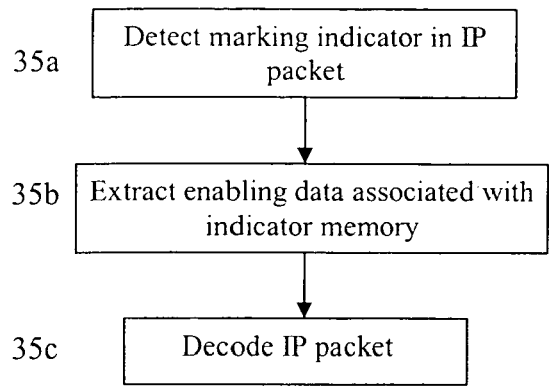
Figure 11:
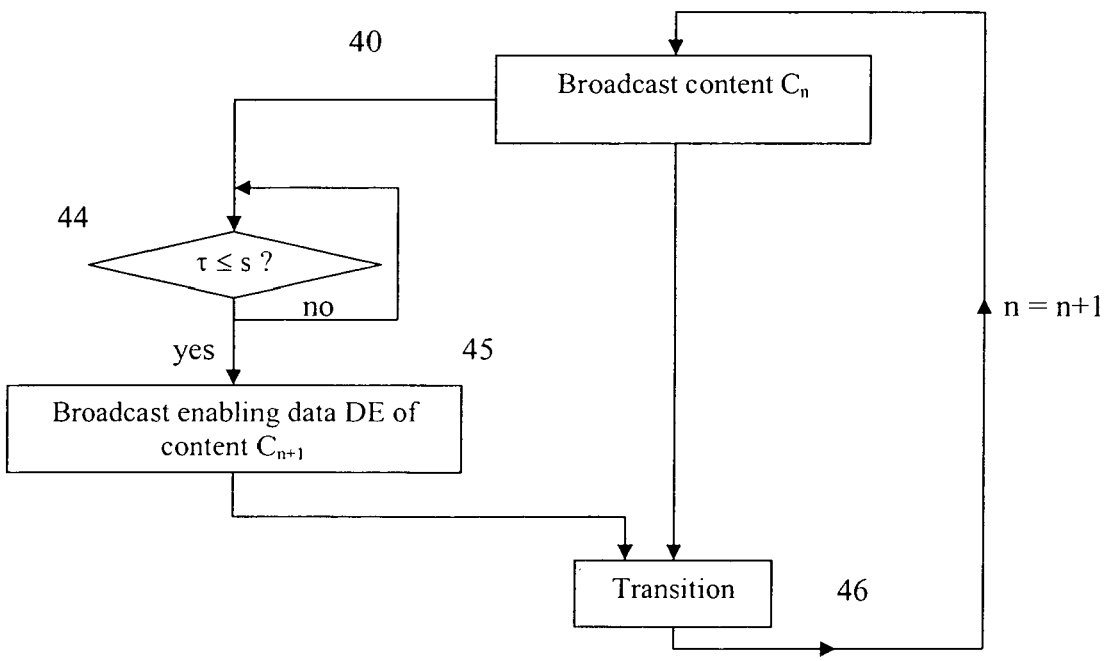

In a step 32, the terminal T receives the enabling data DE relating to the content $C_n$ being broadcast, supplied by the signaling channel CS. Each sending of enabling data contains all the information needed to receive the broadcast channels $CD_x$ in order to recover the content $C_n$, the configuration characteristics enabling the received content $C_n$ to be decoded correctly, and the marking indicator of the content $C_n$. The terminal T stores the enabling data DE of the content $C_n$ with the corresponding marking indicator in its memory 234. Using the enabling data DE for the content $C_n$, the terminal T receives the broadcast channels $CD_x$ from the source S in a step 33. Referring to FIG. 8, using the IGMP, the terminal T therefore sends a request to acquire the broadcast channels $CD_x$ over the Internet in a step 33a. In a step 33b, the first Internet router that receives this request when it is already receiving the IP packets of content broadcast by the source S duplicates the IP packets and routes them to the terminal T. In a step 34, the terminal T receives the data packets of the various screens conveying the content $C_n$ via the broadcast channels $CD_x$.

In a step 35, the terminal T decodes the content $C_n$ received. For this purpose, the terminal T detects the marking indicator inserted in each IP data packet received (step 35a) in order to identify the content $C_n$ to which it belongs, extracts from the memory 234 the enabling data DE associated with that marking indicator (step 35b), and then decodes the data packet using this enabling data DE (step 35c).

Figure 12:
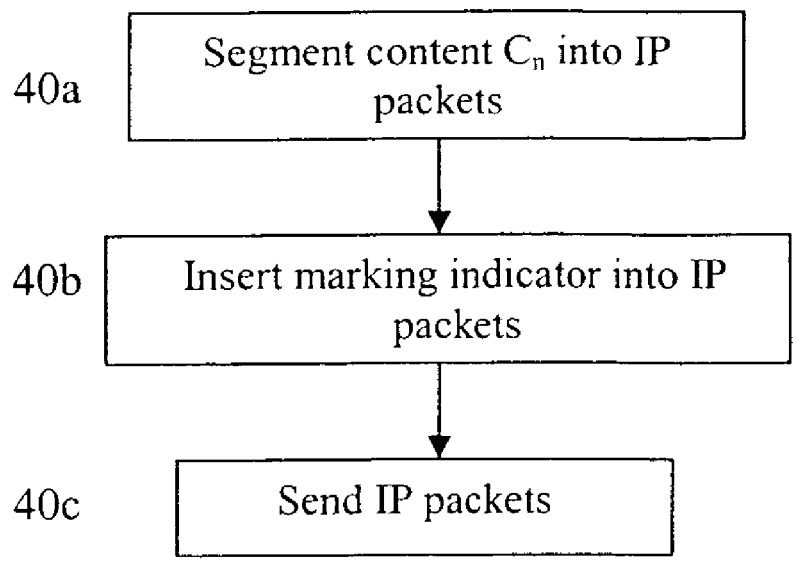
Figure 13:
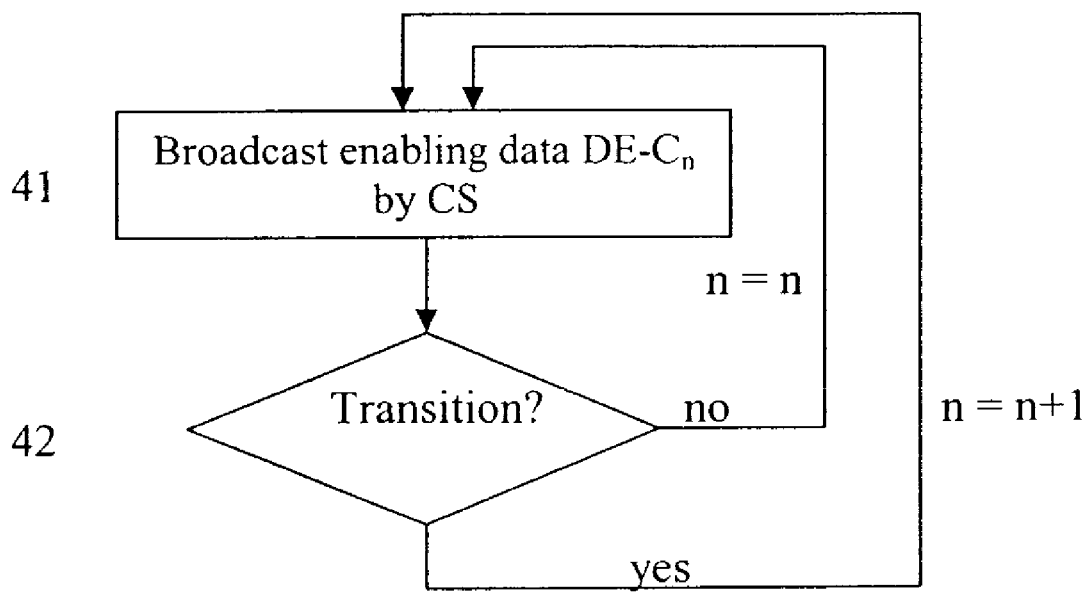
Figure 14:
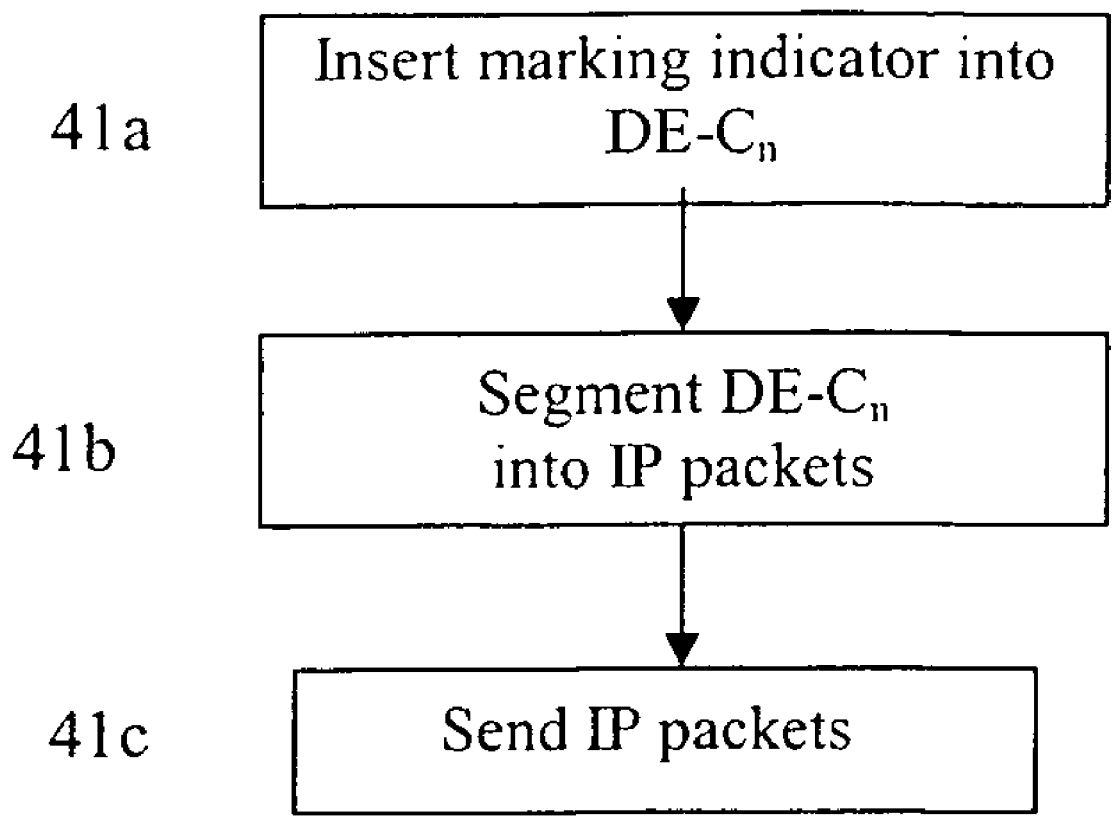

In a step 36, during broadcasting of the content $C_n$, the terminal C receives via the signaling channel CS the enabling data of the next content $C_{n+2}$ sent by the source S in the step 41 (FIG. 12). The step 34 is executed again after the transition 46, but this time for the next content $C_{n+1}$. Thus the terminal T receives the content $C_{n+1}$ via the broadcasting channel CD and, in parallel with this, the corresponding enabling data via the signaling channel CS.

The source S could calculate the time threshold s used in the step 44 to determine approximately the time from which it is necessary to broadcast the enabling data block of the next content $C_{n+1}$ using the following formula:

$$s = n \cdot T$$

in which:

T represents the time period between successive sendings of enabling data relating to the same content, and n represents a natural integer whose value is such that, given the rate of non-reception of broadcast data, at least 99% of the receiver terminals receive the enabling data for the content $C_{n+1}$ at least once before the end of broadcasting the content $C_n$.

The value of n is generally set at 3.

The source could comprise two servers respectively broadcasting the enabling data via the signaling channel CS and the contents via the broadcast channels $CD_x$.

Instead of recovering the SDP file from the source S by downloading it from the portal P, the receiver terminal could recover it by any other means, for example by electronic mail or from a permanent medium such as a CD-ROM.

In the foregoing description, during the broadcasting of a content $C_n$, the source S monitors the remaining time τ to broadcast the content $C_n$ and broadcasts enabling data for the next content as soon as the remaining time τ is below a threshold s. In a simplified embodiment of the invention, shown in FIG. 4a, the source S sends the enabling data of the content $C_n$ regularly, together with that of the next content $C_{n+1}$, throughout the broadcasting of the content $C_n$, and there is therefore no need to monitor the remaining time to broadcast the content $C_n$.

Any other type of marking could be used in place of sequential indicators, provided that the respective markings of the contents of each pair of successive contents separated by a single transition are different.

Of course, the invention could be applied to any other type of computer network and in particular to any IP network.

The invention claimed is:

1. A method of broadcasting a plurality of successive contents ($C_n$, $C_{n+1}$) via a computer network from a broadcasting source (S) to a plurality of receiver terminals (T), each of the plurality of contents comprising a plurality of data streams formed of data packets, the method comprising:

marking, with a first marking indicator, each data packet of each data stream of a first content ($C_n$), while the first content ($C_n$) is being broadcast;

marking, with the first marking indicator, each data packet of at least one data stream of enabling data of the first content ($C_n$), while the first content ($C_n$) is being broadcast, the enabling data of the first content ($C_n$) comprising: (i) a plurality of broadcast channel addresses for receiving the data streams of the first content ($C_n$), and (ii) configuration characteristics for the plurality of receiver terminals to decode the first content ($C_n$);

marking, with a second marking indicator, each data packet of at least one data stream of enabling data of a second content ($C_{n+1}$), while the first content ($C_n$) is being broadcast prior to a transition between the first content ($C_n$) and the second content ($C_{n+1}$), the enabling data of the second content ($C_{n+1}$) comprising: (i) a plurality of broadcast channel addresses for receiving the data streams of the second content ($C_{n+1}$), and (ii) configuration characteristics for the plurality of receiver terminals to decode the second content ($C_{n+1}$);

after the transition between the first content ($C_n$) and the second content ($C_{n+1}$), marking, with the second marking indicator, each data packet of each data stream of the second content ($C_{n+1}$), while the second content ($C_{n+1}$) is being broadcast; and marking, with the second marking indicator, each data packet of the at least one data stream of enabling data of the second content ($C_{n+1}$), while the second content ($C_{n+1}$) is being broadcast, wherein the first marking indicator is uniquely associated with the first content ($C_n$) at least during a period in which the first content ($C_n$) is being broadcast and during a period in which the second content ($C_{n+1}$) is being broadcast; and wherein the first content ($C_n$) and the second content ($C_{n+1}$) are broadcast successively by the source (S) with a single transition between the first content ($C_n$) and the second content ($C_{n+1}$).

2. The method of claim 1, further comprising:

determining a remaining broadcasting time (t) before the transition between the first content ($C_n$) and the second content ($C_{n+1}$); and initiating, when the remaining broadcasting time (t) is determined to be less than a defined time threshold, said step of marking, with the second marking indicator, each data packet of the at least one data stream of enabling data of the second content ($C_{n+1}$), while the first content ($C_n$) is being broadcast.

3. The method of claim 2, wherein the defined time threshold is determined using a formula: s=nT, in which: T represents a time period between successive transmissions of the data packets of the at least one data stream of enabling data of the second content ($C_{n+1}$), and n represents a natural integer whose value is such that, given a defined rate of non-reception of broadcast data, at least about 99% of receiver terminals receive the enabling data of the second content ($C_{n+1}$) at least once before an end of broadcasting of the first content ($C_n$).

4. The method of claim 1, wherein said step of marking, with the second marking indicator, each data packet of the at least one data stream of enabling data of the second content ($C_{n+1}$), while the first content ($C_n$) is being broadcast, is performed regularly throughout the broadcast of the first content ($C_n$).

5. The method of claim 1, wherein said steps of marking with the first marking indicator and said steps of marking with the second marking indicator comprise inserting the first or second marking indicator, respectively, into each data packet being marked.

6. The method of claim 5, wherein the first or second marking indicator is inserted into a header of each data packet being marked.

7. The method of claim 5, wherein the first or second marking indicator is inserted into a header of a protocol layer of each data packet being marked.

8. The method of claim 7, wherein the first or second marking indicator is inserted into a header of a synchronization layer or a flexmux layer.

9. The method of claim 1, wherein each of the plurality of contents ($C_n$, $C_{n+1}$) comprises at least one video data stream and at least one audio data stream.

10. The method of claim 1, further comprising, following said steps of marking with the first marking indicator and said steps of marking with the second marking indicator, sending the marked data packets.

11. A broadcasting source (S) configured to broadcast a plurality of successive contents ($C_n$, $C_{n+1}$) via a computer network to a plurality of receiver terminals (T), each of the plurality of contents comprising a plurality of data streams formed of data packets, the broadcasting source (S) comprising:
a data stream marking unit configured to mark, with a first marking indicator, each data packet of each data stream of a first content ($C_n$), while the first content ($C_n$) is being broadcast;
an enabling data stream marking unit configured to mark, with the first marking indicator, each data packet of at least one data stream of enabling data of the first content ($C_n$), while the first content ($C_n$) is being broadcast, the enabling data of the first content ($C_n$) comprising: (i) a plurality of broadcast channel addresses for receiving the data streams of the first content ($C_n$), and (ii) configuration characteristics for the plurality of receiver terminals to decode the first content ($C_n$);
the enabling data stream marking unit being further configured to mark, with a second marking indicator, each data packet of at least one data stream of enabling data of a second content ($C_{n+1}$), while the first content ($C_n$) is being broadcast prior to a transition between the first content ($C_n$) and the second content ($C_{n+1}$), the enabling data of the second content ($C_{n+1}$) comprising: (i) a plurality of broadcast channel addresses for receiving the data streams of the second content ($C_{n+1}$), and (ii) configuration characteristics for the plurality of receiver terminals to decode the second content ($C_{n+1}$);
the data stream marking unit being further configured to mark, with the second marking indicator, after the transition between the first content ($C_n$) and the second content ($C_{n+1}$), each data packet of each data stream of the second content ($C_{n+1}$), while the second content ($C_{n+1}$) is being broadcast; and
the enabling data stream marking unit being further configured to mark, with the second marking indicator, each data packet of the at least one data stream of enabling data of the second content ($C_{n+1}$), while the second content ($C_{n+1}$) is being broadcast,
wherein the first marking indicator is uniquely associated with the first content ($C_n$) at least during a period in which the first content ($C_n$) is being broadcast and during a period in which the second content ($C_{n+1}$) is being broadcast; and
wherein the first content ($C_n$) and the second content ($C_{n+1}$) are broadcast successively by the source (S) with a single transition between the first content ($C_n$) and the second content ($C_{n+1}$).

12. The broadcasting source of claim 11, further comprising:
a data stream sending unit configured to send the data packets of the content data streams after the content data packets have been marked; and
an enabling data stream sending unit configured to send the data packets of the enabling data streams after the enabling data packets have been marked.

13. A receiver terminal (T) configured to receive a plurality of successive contents ($C_n$, $C_{n+1}$) via a computer network from a broadcasting source (S), each of the plurality of contents comprising a plurality of data streams formed of data packets, the receiver terminal (T) comprising:
a first receiving unit configured to receive content data streams;
a detection unit configured to detect marking of content data streams; and
a second receiving unit configured to receive enabling data streams,
wherein the receiver terminal (T) is configured to display a plurality of successive contents ($C_n$, $C_{n+1}$) received from a broadcasting source (S) which has performed a method comprising:
marking, with a first marking indicator, each data packet of each data stream of a first content ($C_n$), while the first content ($C_n$) is being broadcast;
marking, with the first marking indicator, each data packet of at least one data stream of enabling data of the first content ($C_n$), while the first content ($C_n$) is being broadcast, the enabling data of the first content ($C_n$) comprising: (i) a plurality of broadcast channel addresses for receiving the data streams of the first content ($C_n$), and (ii) configuration characteristics for the plurality of receiver terminals to decode the first content ($C_n$);
marking, with a second marking indicator, each data packet of at least one data stream of enabling data of a second content ($C_{n+1}$), while the first content ($C_n$) is being broadcast prior to a transition between the first content ($C_n$) and the second content ($C_{n+1}$), the enabling data of the second content ($C_{n+1}$) comprising: (i) a plurality of broadcast channel addresses for receiving the data streams of the second content ($C_{n+1}$), and (ii) configuration characteristics for the plurality of receiver terminals to decode the second content ($C_{n+1}$);

after the transition between the first content ($C_n$) and the second content ($C_{n+1}$), marking, with the second marking indicator, each data packet of each data stream of the second content ($C_{n+1}$), while the second content ($C_{n+1}$) is being broadcast; and marking, with the second marking indicator, each data packet of the at least one data stream of enabling data of the second content ($C_{n+1}$), while the second content ($C_{n+1}$) is being broadcast, wherein the first marking indicator is uniquely associated with the first content ($C_n$) at least during a period in which the first content ($C_n$) is being broadcast and during a period in which the second content ($C_{n+1}$) is being broadcast; and wherein the first content ($C_n$) and the second content ($C_{n+1}$) are broadcast successively by the source (S) with a single transition between the first content ($C_n$) and the second content ($C_{n+1}$).

* * * * *